March 8, 1949.  W. F. BERCK  2,463,737
SELECTIVE VALVE MANIFOLD FOR GASOLINE
TANK TRUCKS AND THE LIKE
Filed Jan. 4, 1945
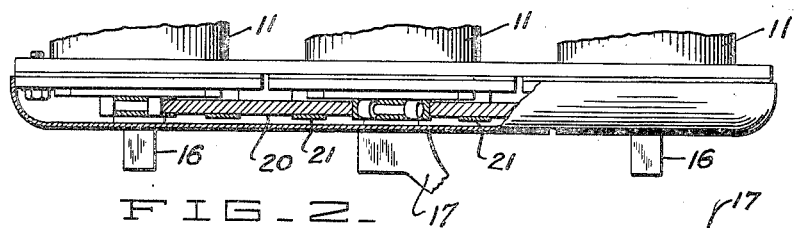
FIG_2_
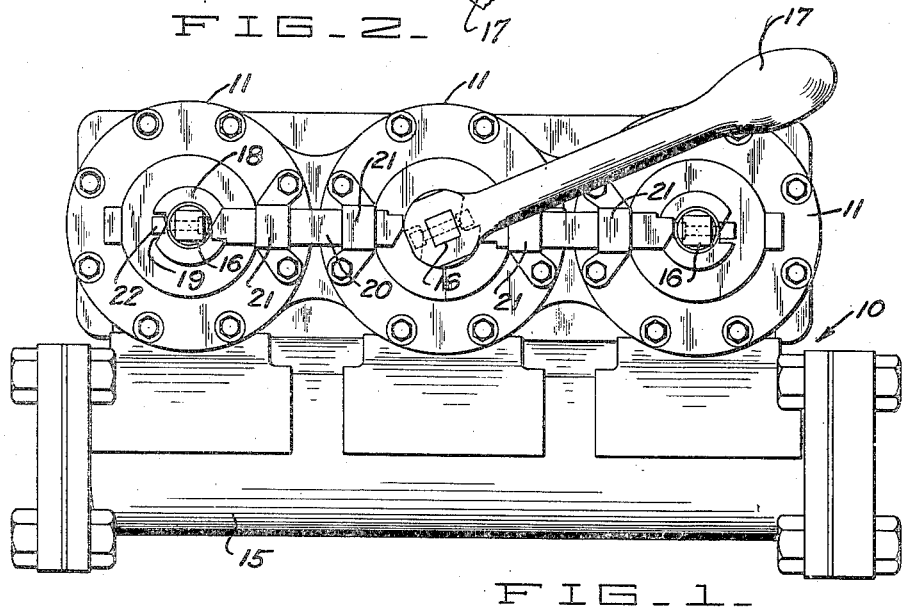
FIG_1_
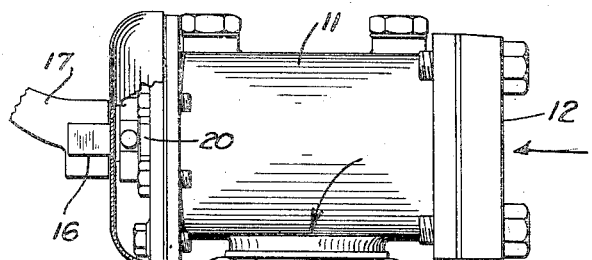
FIG_3_
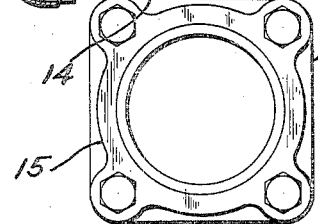
INVENTOR.
WILLIAM F. BERCK
BY
Oscar A. Mellin
ATTORNEY.

Patented Mar. 8, 1949

2,463,737

UNITED STATES PATENT OFFICE 2,463,737

SELECTIVE VALVE MANIFOLD FOR GASOLINE TANK TRUCKS AND THE LIKE

William F. Berck, Oakland, Calif., assignor to Ralph N. Brodie Company, Oakland, Calif., a corporation of California Application January 4, 1945, Serial No. 571,292

4 Claims. (Cl. 277—1)

1

This invention relates to valves and particularly pertains to a selective valve manifold for use in connection with tanks having separate compartments or separate tanks which are connected with a common discharge line.

Tank trucks for delivering gasoline and other oils are usually divided into separate compartments or tanks, each fitted with a separate discharge valve. The outlet connections of these valves are ordinarily connected with a meter through a common discharge pipe line. In the event a valve associated with an empty compartment is partly open, while the valve associated with a full compartment is open to deliver fluid to the discharge line, air is drawn into the discharge line from the empty compartment and the meter measures this air with the fluid. The consequence of this is that the actual gallonage delivered will be less than that indicated by the meter.

It is the principal object of my invention to provide a simple, efficient and inexpensive means which operates automatically when one valve is opened to positively latch the remaining valves against opening movement.

In practice, I provide a valve manifold composed of a plurality of separate valves. A latching mechanism is associated with the valve stems of these valves so that only one valve may be open at a time. The mechanism is automatic in that when one valve is open, the other valves are automatically latched against opening movement.

One form which the invention may assume is exemplified in the following description and illustrated by way of example in the accompanying drawings, in which:

Fig. 1 is a plan view of a valve manifold embodying the preferred form of my invention.

Fig. 2 is a fragmentary view in side elevation of the valve with parts broken away and with parts in section to more fully disclose certain details of construction.

Fig. 3 is an end view of the valve manifold with parts broken away to disclose certain features of construction.

Referring more particularly to the accompanying drawings, 10 indicates a valve manifold embodying the preferred form of my invention. This valve manifold is composed of three separate but rigidly connected valves 11, each having a separate inlet connection 12 by means of which the valves may be each connected with a separate tank or separate compartment of a single tank. Although in the present instance I have shown the manifold as composed of but three valves, after an understanding of the invention, it will be apparent that it may be composed of two or more valves as desired.

The outlet connection 14 of each valve is suitably secured by bolts or otherwise to a companion connection on the manifold 15. This manifold 15 may be interposed in a pipe line and constitutes the medium for enabling the valves 11 to have a common discharge connection.

The valves 11 may be of the type disclosed in my copending application entitled "Valve," bearing Serial No. 571,291, filed January 4, 1945. However, the valves may be of any type in which the valve is opened and closed by rotation of the valve stem, which in this instance is indicated at 16, and in which the valve opening and closing movement requires less than 180° of rotation of the valve stem 16.

In this instance a portion of the valve stem 16 of each valve projects beyond the end of the body of the valve 11 and is squared in order to be received in the square socket of a valve operating handle or wrench 17. Because of the provision of the square socket in the valve operating wrench 17, it may be removably engaged with the valve stem 16 of any one of the three valves 11 for opening and closing the same.

At the upper end of each valve body there is secured on each valve stem a keeper ring 18 which is formed with diametrically opposite keeper sockets 19. One side of each keeper socket 19 is beveled to provide a cam surface for cooperation with a complementary cam surface on the adjacent end of a keeper 20, one of which is provided between each pair of adjacent valves.

It will suffice to point out that each keeper 20 is guided in keeper guides 21 for reciprocation on a line passing between the centers of the adjacent valve stems so that the keeper 20 will move radially thereof. The ends of each keeper 20 are complemental to the keeper sockets 19 so that these ends may be received therein when the sockets are aligned or registered with the end of the keeper 20 to latch the valve against turning movement. When the keeper sockets 19 register with and are engaged by the keeper, the valve is in closed position.

Arranged diametrically of each valve stem centrally of the keeper ring 18 and in alignment with the keeper sockets 19 is a keeper ejector 22. This keeper ejector 22 is reciprocable diametrically of the valve stem and is of a length that when a keeper 20 is engaged with one of the sockets 19, the opposite end of the ejector 22 will project through the opposite keeper socket 19 so as to move the keeper on the opposite side of the valve stem longitudinally so that it will engage the keeper socket 19 of the keeper ring 18 of the next adjacent valve.

For example, assuming that the wrench 17 is engaged with the valve stem 16 of the valve at the right-hand side of the manifold, and assuming that this valve stem is turned to open the valve, the cooperating cam surfaces of its keeper socket 19 and the adjacent keeper 20 will cause that keeper to be moved to the left to engage the keeper socket in the next adjacent valve, which at that time will be in closed position. Upon this engagement the keeper will engage the ejector 22 and project the same outwardly to the left and engage the adjacent keeper 20 and move it to the left sufficiently to insure that its end will engage the keeper socket 19 of the keeper ring 18 of the valve at the left-hand end of the manifold. It is seen that each keeper is of a length that it will extend from the periphery of one keeper ring 18 into the socket 19 of the adjacent keeper ring so that it may only engage one socket at a time. Thus, by the provision of the ejector 22, when one valve is open, movement is transmitted to both of the keepers to engage and latch the remaining valves in closed position.

In operation of the device, it is constructed and assembled as shown in the drawings. In Fig. 1 of the drawings the center valve is shown in open position and it should be pointed out that to open the valve, it is only necessary to turn the valve stem through an angle slightly less than one hundred eighty degrees. In fact, the valve member is so constructed that the valve stem can only be turned an amount less than one hundred eighty degrees from fully closed to fully open position. Thus, when the valve is moved to open position, its keeper sockets 19 will be out of register with the keepers. As is seen from Fig. 1, the moment that the center valve stem is turned from closed position toward open position, the cooperating cam surfaces of the keeper sockets 19 and keeper members 20 will cause the two keepers to be projected toward the valve stem of the other two valves. Inasmuch as these are in closed position, the keepers will be engaged with the keeper sockets thereof and will effectively latch the same against opening so that they cannot be opened until the center valve is fully closed. Likewise, if the wrench 17 is applied to one of the other valves after the center valve has been closed, its keeper ring 18 will be turned and immediately will project the adjacent keeper toward the center valve to engage the keeper with the socket 19 of the keeper ring 18 of that valve. Upon such engagement the ejector member 22 of that valve will be moved by the engaging keeper member so as to project the other keeper member into engagement with the socket 19 of the keeper ring 18 of the next valve. Consequently, the minute that opening movement is transmitted to one valve, the other two valves are latched against opening movement, and it will be impossible to open the same until the opened valve has been moved to closed position.

It is seen from the foregoing that but one valve can be opened at a time because when one valve is open, the other two valves are latched in closed position.

From the foregoing it is obvious that I have provided a valve manifold by means of which fluid may be drawn from only one compartment or tank of a particular group at a time, and while fluid is being drawn from the selected tank or compartment, fluid cannot be drawn from the remaining compartments or tanks of the group.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination with a plurality of spaced parallel rotatable members, a keeper ring on each member, said ring having a keeper socket, a reciprocable keeper bar between said rotatable members and extending between said rings approximately in alignment with the axial centers of said rotatable members and movable toward and away from the centers thereof, complementary means on said keeper and sockets whereby rotation of one member from normal position will engage said keeper bar with the socket on the adjacent ring and maintain such engagement until the member which has been rotated is returned to normal position.

2. In combination with a pair of relatively fixed valves having rotatable valve stems spaced apart in parallelism, a keeper ring fixed on each stem, each keeper ring having a keeper socket, a reciprocable keeper bar extending between said rings approximately in alignment with the axial centers of said valve stems and of a length whereby it will extend from the periphery of one ring into engagement with the socket on the other ring, complementary means on said keeper bar and sockets whereby rotation of one stem from normal position will engage said keeper bar with the socket on the adjacent ring and maintain such engagement until the rotated stem is returned to normal position.

3. In combination with three relatively fixed valves having rotatable valve stems spaced apart in parallelism, a keeper ring fixed on each stem, keeper sockets formed in said keeper rings adapted to align when said stems are in closed position, a keeper arranged between said valves and reciprocable in a direction toward and away from the centers of said stems, each keeper being of a length whereby it will extend from the periphery of one keeper ring into the socket on the adjacent keeper ring, complementary means on said keepers and sockets whereby rotation of one stem from closed position will cause said keepers to engage the sockets in the keeper rings of the other stems and maintain such engagement until the rotated stem is returned to closed position, there being two of said sockets on each keeper ring arranged at diametrically opposite points thereon, diametrically movable means mounted in each keeper ring in register with the sockets and capable of projecting thereinto, said diametrically movable means being engageable by a keeper when said keeper projects into one of said sockets and being moved diametrically by such engagement to eject a keeper engaged with the other of said sockets and move the latter keeper into engagement with the socket on the adjacent keeper ring.

4. In combination with three relatively fixed valves having rotatable valve stems spaced apart in parallelism, a keeper ring fixed on each stem, keeper sockets formed in said keeper rings adapted to align when said stems are in closed position, a keeper bar slidably mounted between each adjacent pair of valves in approximate alignment with the axial centers of said valve stems and reciprocable in a direction toward and away from the centers of said stems, each keeper bar being of a length whereby it will extend from the periphery of one keeper ring into the socket on the adjacent keeper ring, complementary means on said keeper bars and sockets whereby rotation of one stem from closed position will cause said keeper bars to engage the sockets in the keeper rings of the other stems and maintain such engagement until the rotated stem is returned to closed position.

WILLIAM F. BERCK.

REFERENCES CITED

The following references are of record in the file of this patent:

UNITED STATES PATENTS

| Number | Name | Date |
| --- | --- | --- |
| 887,826 | Maniex | May 19, 1908 |
| 1,571,053 | Harter | Jan. 26, 1926 |
| 2,371,727 | Andrews | Mar. 20, 1945 |

FOREIGN PATENTS

| Number | Country | Date |
| --- | --- | --- |
| 126,481 | Great Britain | May 13, 1919 |
| 152,927 | Great Britain | Oct. 28, 1920 |
| 170,330 | Great Britain | Oct. 17, 1921 |
| 490,266 | Great Britain | Aug. 11, 1938 |